(12) United States Patent
Yazaki et al.

(10) Patent No.: US 7,565,082 B2
(45) Date of Patent: Jul. 21, 2009

(54) DATA TRANSMISSION METHOD AND SYSTEM THEREOF, PORTABLE TERMINAL, AND DATA RECEIVER

(75) Inventors: Tomonori Yazaki, Kamifukuoka (JP); Masashi Usami, Tokyo (JP)

(73) Assignee: KDDI Corporation, Tokyo (JP)

( * ) Notice: Subject to any disclaimer, the term of this patent is extended or adjusted under 35 U.S.C. 154(b) by 602 days.

(21) Appl. No.: 11/205,854

(22) Filed: Aug. 16, 2005

(65) Prior Publication Data

US 2006/0062099 A1   Mar. 23, 2006

(30) Foreign Application Priority Data

Aug. 27, 2004  (JP) ............... 2004-248688

(51) Int. Cl.
H04B 10/00 (2006.01)
H04B 10/10 (2006.01)

(52) U.S. Cl. .............. 398/129; 398/128; 398/130; 398/131; 398/118

(58) Field of Classification Search ......... 398/118–131; 369/44.11, 47.3, 112.01
See application file for complete search history.

(56) References Cited

U.S. PATENT DOCUMENTS

| | | | | |
|---|---|---|---|---|
| 6,151,149 A * | 11/2000 | Rybicki et al. | ............... | 398/191 |
| 6,230,214 B1 * | 5/2001 | Liukkonen et al. | ............. | 710/1 |
| 6,233,094 B1 * | 5/2001 | Tsuda | ......... | 359/400 |
| 6,661,546 B1 * | 12/2003 | Plett | ............. | 359/15 |
| 6,795,174 B1 * | 9/2004 | Miller | ...... | 356/141.1 |
| 7,120,363 B2 * | 10/2006 | Andreu-von Euw et al. | . | 398/129 |
| 2002/0131121 A1 * | 9/2002 | Jeganathan et al. | ........ | 359/152 |
| 2003/0053164 A1 * | 3/2003 | Stappaerts | ................ | 359/110 |
| 2003/0090765 A1 * | 5/2003 | Neff et al. | .................. | 359/172 |
| 2004/0165892 A1 * | 8/2004 | Mendenhall | ............... | 398/118 |

* cited by examiner

Primary Examiner—Ken N Vanderpuye
Assistant Examiner—Li Liu
(74) Attorney, Agent, or Firm—Christie, Parker & Hale, LLP

(57) ABSTRACT

In a data transmission method according to an exemplary embodiment, a data transmitter, which is capable of outputting a dummy light for judging an optical axis and a signal light having a beam spread smaller than that of the dummy light on the same optical axis, outputs the dummy light for scan so as to go across a photoreceiving part of a data receiver. When the dummy light having a predetermined optical level or more is optically received, the data receiver informs the data transmitter of reception chance and prepares for receiving the data. The data transmitter outputs the data carried by the signal light to the data receiver according to the information indicating the reception chance from the data receiver. The data receiver receives the data by optically receiving the signal light from the data transmitter.

2 Claims, 5 Drawing Sheets

DATA TRANSMISSION METHOD AND SYSTEM THEREOF, PORTABLE TERMINAL, AND DATA RECEIVER

CROSS REFERENCE TO RELATED APPLICATIONS

This application claims priority to Japanese Patent Application No. 2004-248688, filed on Aug. 27, 2004, the entire contents of which are incorporated herein by reference.

FIELD OF THE INVENTION

This invention relates to a data transmission method and its system, a portable terminal, and a data receiver.

BACKGROUND OF THE INVENTION

Owing to the conditions that a lot of sorts of portable terminals have functions of image processing, especially the functions of digital camera, there is a great need for massive data transmission. A portable terminal with a built-in digital camera is capable of recording still images and moving images and accordingly methods for transmitting such image data to the outside have been in demand. A method generally used at present is to attach image data to e-mails.

As the number of pixels per picture increases, however, data volume of one image has extremely increased and, therefore, the above method to transmit image data for another units by attaching the data to e-mail causes overloads of networks and also the communication costs are mounted up to the large sum.

Although it is possible to easily obtain high-speed transmission using a wired communication system, this system is rather inconvenient for everyday use because it is time-consuming and troublesome to connect signal lines before you start transmission and in addition you are required to carry signal cables suitable for both of your own unit and the other party's unit all the time.

SUMMARY OF THE INVENTION

In a data transmission method according to an exemplary embodiment, a data transmitter, which is capable of outputting a dummy light for judging an optical axis and a signal light having a beam spread smaller than that of the dummy light on the same optical axis, outputs the dummy light for scan so as to go across a photoreceiving part of a data receiver. When the dummy light having a predetermined optical level or more is optically received, the data receiver informs the data transmitter of reception chance and prepares for receiving the data. The data transmitter outputs the data carried by the signal light to the data receiver according to the information indicating the reception chance from the data receiver. The data receiver receives the data by optically receiving the signal light from the data transmitter.

According to an exemplary embodiment of the invention, a data transmission system to transmit data from a data transmitter to a data receiver through open transmission is provided. The data transmitter includes a laser light source to generate a signal light, a dummy light source to generate a dummy light for judging an optical axis, an optical system to output the signal light and the dummy light on the same optical axis, making a beam spread of the signal light smaller than that of the dummy light, a receiving circuit to receive a reception OK signal from the data receiver, and a driving circuit to drive the laser light source to output the signal light for carrying the data according to reception of the reception OK signal from the data receiver by the receiving circuit. The data transmitter can scan the optical axis of the signal light and the dummy light so as to go across a photoreceiving part of the data receiver. The optical axis of the signal light and the dummy light can be scanned so as to go across a photoreceiving part of the data receiver. The data receiver includes a photodetector to optically receive the dummy light and the signal light, a level judging apparatus to judge a level of an electrical signal output from the photodetector, a transmitting circuit to transmit the reception OK signal to the data transmitter when the electrical signal from the photodetector has the predetermined level or more according to the judged result from the level judging apparatus, a data demodulating circuit to prepare for demodulating the data out of the electrical signal from the photodetector when the electrical signal output from the photodetector has the predetermined level or more according to the judged result from the level judging apparatus to demodulate the data included in the electrical signal output from the photodetector, and a reception result informing apparatus to inform a reception result of the data.

According to an exemplary embodiment of the invention, a portable terminal to transmit data to a data receiver through open transmission is provided. The portable terminal includes a laser light source to generate a signal light, a dummy light source to generate a dummy light for judging an optical axis, an optical system to output the signal light and the dummy light on the same optical axis, making a beam spread of the signal light smaller than that of the dummy light, a receiving circuit to receive a reception OK signal from the data receiver, and a driving circuit to drive the laser light source to output the signal light for carrying the data according to reception of the reception OK signal by the receiving circuit A data transmission method according to another exemplary embodiment of the invention, a data transmission method to transmit data from a data transmitter, which outputs a laser light not to carry data under a data transmission standby state and outputs a signal light of a laser light to carry data according to a data transmission start instruction, to a data receiver through open transmission. The data transmitter is swung horizontally so that the laser light output from the data transmitter goes across a photoreceiving part of the data receiver. The data receiver signals a reception chance to the data transmitter and prepares for receiving the data, according to the reception of the laser light having a predetermined optical level or more by the data receiver. The data transmitter outputs the signal light to the data receiver according to the reception OK signal from the data receiver. The data receiver receives the data by optically receiving the signal light from the data transmitter.

According to another exemplary embodiment of the invention, a data transmission system to transmit data from a data transmitter to a data receiver through open transmission is provided. The data transmitter includes a laser light source to generate a laser light, an optical system to output the laser light to the outside, a receiving circuit to receive a reception OK signal from the data receiver, and a driving circuit to drive the laser light source to carry the data according to reception of the reception OK signal from the data receiver by the receiving circuit. The data receiver includes a photodetector to convert the laser light into an electrical signal, a condensing optical system to condense the laser light from the data transmitter into the photodetector, a level judging apparatus to judge a level of the electrical signal output from the photodetector, a transmitting circuit to transmit the reception OK signal for the data transmitter when the electrical signal from the photodetector has a predetermined level or more according to the judged result from the level judging apparatus, a data demodulating circuit to prepare for demodulating the data out of the electrical signal from the photodetector and to demodulate the data included in the electrical signal from the photodetector when the electrical signal from the photodetector has the predetermined level or more according to the judged result from the level judging apparatus, and a reception result informing apparatus to inform the reception result of the data.

According to another exemplary embodiment of the invention, a data receiver to receive a data carried by a laser light from a data transmitter through open transmission. The data receiver includes a photodetector to convert the laser light into an electrical signal, a condensing optical system to condense the laser light from the data transmitter into the photodetector, a level judging apparatus to judge a level of the electrical signal output from the photodetector, a transmitting circuit to transmit a reception OK signal for the data transmitter when the electrical signal from the photodetector has a predetermined level or more according to a judged result from the level judging apparatus, a data demodulating circuit to prepare for demodulating the data out of the electrical signal from the photodetector when the electrical signal from the photodetector has the predetermined level or more according to the judged result from the level judging apparatus to demodulate the data included in the electrical signal from the photodetector, and a reception result informing apparatus to inform a reception result of the data.

With the exemplary embodiments according to the invention, it is possible to easily transmit data at high-speed through optical open transmission. Since a signal light with a narrow beam angle can be used, high-speed data transmission is realized. A data is transmitted at high-speed during a quite short period when optical axes of a data transmitter and a data receiver aligns with each other and therefore a great volume of data can be transmitted in an instant. It is unnecessary to precisely adjust the optical axes and thus it can be used easily.

BRIEF DESCRIPTION OF THE DRAWINGS

The above and other objects, features and advantages of the present invention will be apparent from the following detailed description of exemplary embodiments of the invention in conjunction with the accompanying drawings, in which.

DETAILED DESCRIPTION

Explanatory embodiments of the invention are explained below in detail with reference to the drawings.

Figure 1:
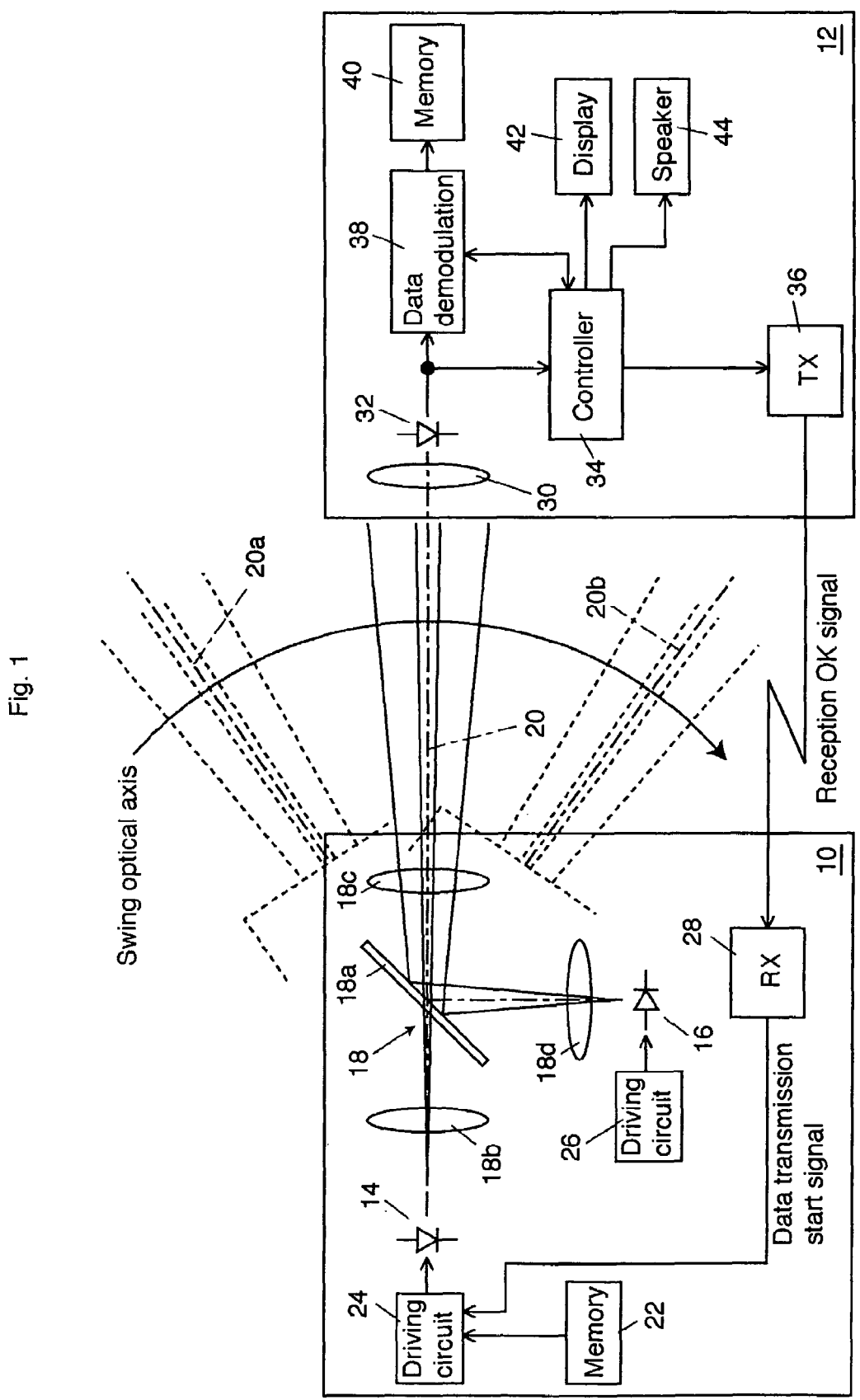
FIG. 1 shows a schematic block diagram of a first exemplary embodiment according to the invention.

FIG. 1 shows a schematic block diagram of a first exemplary embodiment according to the invention. A data transmitter 10, for example, a portable telephone or cellular phone transmits data for a data receiver 12 through optical open transmission. An optical axis of a free space optical transmission path between the data transmitter 10 and the data receiver 12 is manually adjusted. As to be mentioned below, however, since this exemplary embodiment realizes high-speed transmission, data transmission itself can be finished in a moment.

The configuration and basic operation of the data transmitter 10 is explained below. The data transmitter 10 includes a laser diode 14 to generate a signal light to carry a data and a laser diode 16 to generate a dummy laser light for judging an optical axis, the dummy light being used when the data receiver 12 determines whether the optical axis of the data transmitter 10 meets with a photoreceiving part of the data receiver 12.

A projecting optical system 18 combines the output lights from the laser diodes 14 and 16 on the same optical axis 20 and projects to the outside. However, the signal light output from the laser diode 14 is projected with a small beam spread from the data transmitter 10 to the outside while the dummy light output from the laser diode 16 is projected with a beam spread larger than that of the signal light from the data transmitter 10 to the outside. The projecting optical system 18 includes a half mirror 18a to combine the signal light from the laser diode 14 and the dummy light from the laser diode 16 and lenses 18b, 18c, and 18d to project the signal light and the dummy light with desired beam spreads.

It is preferable that the dummy laser light is visible so that a user of the data transmitter 10 can visually confirm an irradiation point of the signal light.

A memory 22 stores a to-be-transmitted data, e.g. an image data. A driving circuit 24 drives the laser diode 14 according to the data read out from the memory 22. Thus, the laser diode 14 outputs a signal light to carry the data read out from the memory 22 by intensity modulations. The driving circuit 26 DC-drives or pulse-drives the laser diode 16 with a suitable frequency.

A receiving circuit 28 receives a reception OK signal from the data receiver 12. On receiving the reception OK signal, the receiving circuit 28 applies a data transmission start signal to the driving circuit 24. When the driving circuit 24 receives the data transmission start signal from the receiving circuit 28, it reads out the data from the memory 22 to drive the laser diode 14.

The configuration and basic operation of the data receiver 12 is explained below. A condensing lens 30 condenses the signal light and the dummy light from the data transmitter and applies them to a photodiode 32. The photodiode 32 outputs an electrical signal of amplitude corresponding to the intensity of the input light. A controlling circuit 34 detects a level of the electrical signal output from the photodiode 32 and controls a transmitting circuit 36, a data demodulating circuit 38, and a speaker 44 according to a detected result.

The first function of the controlling circuit 34 is to instruct the transmitting circuit 36 to inform (the receiving circuit 28 of) the data transmitter 10 that data is receivable and simultaneously instructs the data demodulating circuit 38 to start demodulating the data, when an optical level of an input light from the photodiode 32 reaches a predetermined value or more. That is, the controlling circuit 34 functions as a data receiving possibility determiner to determine whether the optical axis 20 of the output light from the data transmitter 10 agrees with the photoreceiving parts (30, 32) of the data receiver 12 as sufficiently as to be able to receive the data output from the data transmitter 10.

The transmitting circuit 36 transmits a reception OK signal to the receiving circuit 28 of the data transmitter 10 according to the instruction from the controlling circuit 34. The data demodulating circuit 38 starts to demodulate the data carried by the electrical signal from the photodiode 32 according to the instruction from the controlling circuit 34. The controlling circuit 34 indicates on a display 42 that the demodulation of the received data is started. When the demodulation of the data is completed, the data demodulating circuit 38 informs the controlling circuit 34 of the completion. The controlling circuit 34 indicates on the display 42 that the demodulation of the received data is completed, namely the reception of the data is completed.

As the medium to transmit a signal from the transmitting circuit 36 to the receiving circuit 28, any of optical, sound, and wireless transmission can be used. The reception OK signal is a sort of trigger signal to start transmission and therefore it is possible to use a very low-speed transmission medium, such as infrared transmission having a wide field angle, short-range wireless transmission as represented by Bluetooth, and acoustic pulse transmission.

The controlling circuit 34, as the second function, controls a speaker 44 to output a sound with a frequency or volume corresponding to an optical level of an incident light of the photodiode 32 even when the optical level is under a predetermined value. When the optical level of the incident light of the photodiode 32 is lower than the predetermined value, for instance, the speaker 44 outputs a high-pitched sound and when the optical level of the incident light of the photodiode 32 is higher than the predetermined value, the speaker 44 outputs a low-pitched sound. A user of the transmitter 10 can be informed from the sound how its optical axis is aligned with the receiver 12.

Besides varying the pitch of sound, there are some other ways to inform a photoreceiving level of a data receiver to a user like varying volume, varying interval of pulse tones, varying emission intensity or blinking cycle of LED, or indicating a photoreceiving level on a digital display.

Figure 2:
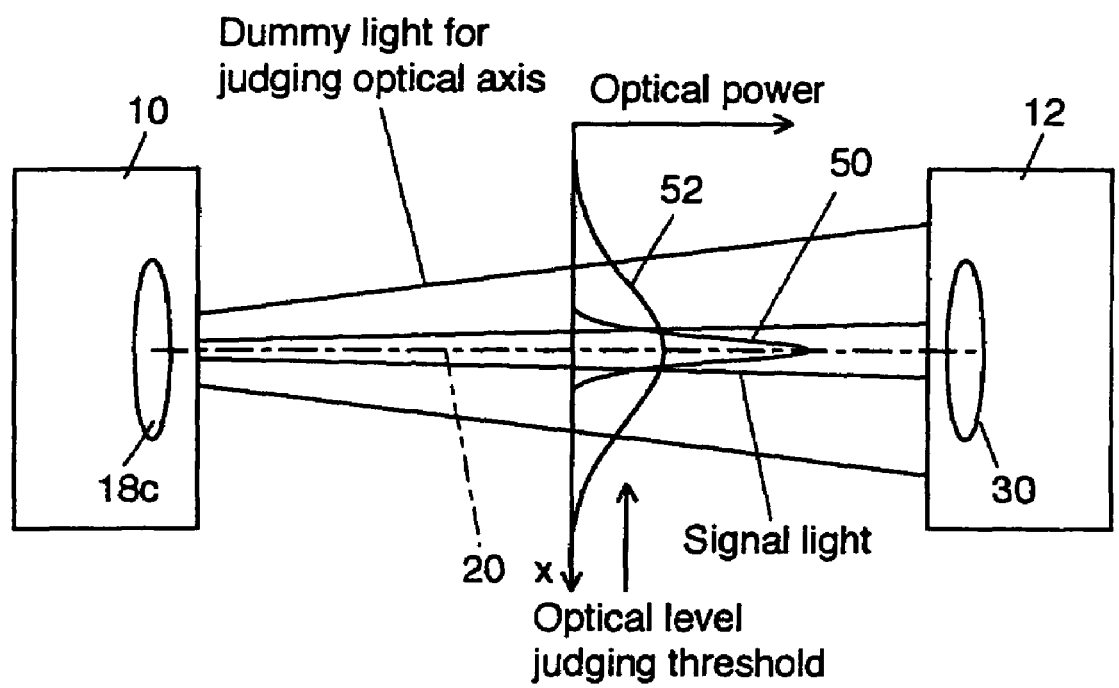
FIG. 2 is a schematic diagram showing beam spread and intensity distributions of a signal light and a dummy light.

FIG. 2 is a schematic diagram showing beam spreads of signal light and dummy light. To make it easily understandable, it shows optical power distributions on a cross section orthogonal to the optical axis 20. A reference numeral 50 denotes an optical power distribution of signal light, and a reference numeral 52 denotes an optical power distribution of dummy light. The peak power of the signal light is higher than that of the dummy light. The threshold of the controlling circuit 34 is set to be lower than the peak power of the dummy light. When a data is to be transmitted, the data transmitter 10 is swung horizontally so that the optical axis 20 goes across the photoreceiving part, that comprises the lens 30 and the photodiode 32, of the data receiver 12. Although the optical axis 20 enters the photoreceiving part, that comprises the lens 30 and the photodiode 32, of the data receiver 12, the previous optical axis 20a and the following optical axis 20b do not enter the photoreceiving part of the data receiver 12. The optical axis moves through 20a, 20, and 20b in that order. In this scanning operation, after the photoreceiving level of the photodiode 32 exceeds the threshold because of the dummy light, the signal light enters the photodiodes 32.

The operation of this exemplary embodiment is specifically explained below. The data transmitter 10 is held in a user's hand and therefore the optical axis 20 is not steadily aligned with the photoreceiving part of the data receiver 12. The data receiver 12 also can be a portable terminal. In this case, it is quite difficult to stably match the optical axis of the open transmission line between the data transmitter 10 and the data receiver 12 and accordingly it becomes difficult to transmit a large volume data from the data transmitter 10 to the data receiver 12. This exemplary embodiment can resolve such a problem through the sequence shown in FIG. 3.

The data transmitter 10 is set to ready to transmit a dummy light by an operating apparatus (not illustrated). The data receiver 12 is set to a receivable state by an operating apparatus (not illustrated) or it is set to the receivable state all the time.

While the data transmitter 10 is transmitting a dummy light (S1), a user of the data transmitter 10 horizontally swings the data transmitter 10 so that the optical axis 20 of a signal light goes across the photoreceiving part, which comprises the lens 30 and the photodiode 32, of the data receiver 12. Since a beam spread of the dummy light is larger, an output electrical signal level of the photodiode 32 increases as the optical axis 20 approaches the photoreceiving part of the data receiver 12 to a certain extent. The user of the data transmitter 10 can check the change of photoreceiving state through a monitor sound indicating a photoreceiving level of the data receiver 12.

When the output electrical signal level of the photodiode 32 exceeds the threshold indicating a receivable level, the controlling circuit 34 instructs the transmitting circuit 36 to transmit a reception OK signal (S2) and the data demodulating circuit 38 to prepare for data demodulation. Having received the reception OK signal from the transmitting circuit 36, the receiving circuit 28 in the data transmitter 10 sends a data-transmission-start signal to the driving circuit 24. The driving circuit 24 reads out the stored data from the memory 22 according to the data-transmission-start signal from the receiving circuit 28 to drive the laser diode 14 based on the read-out data. With this operation, the laser diode 14 outputs a signal light (S3) to carry the data read out from the memory 22. The driving circuit 24 drives the laser diode 14 at such timing that the signal light enters the photodiode 32 within the scanning period of the optical axis 20, considering an average scanning speed of the optical axis 20.

The signal light output from the laser diode 14 enters the photodiode 32 through the optical system 18 and the lens 30 to be converted into an electrical signal by the photodiode 32. Owing to the reception OK signal from the controlling circuit 34 temporally prior to the signal light, the data demodulating circuit 38 is prepared for data demodulation and accordingly demodulates the data from the electrical signal output from the photodiode 32. The demodulated data is stored in the memory 40.

When all the data to be transmitted for the data receiver 12 is transmitted, the driving circuit 24 drives the laser diode 14 by a data transmission completion signal indicating that the data transmission is completed. With this operation, the laser diode 14 outputs a signal light (S4) indicating the completion of the data transmission. This signal light enters the photodiode 32 through the optical system 18 and the lens 30 to be converted into an electrical signal by the photodiode 32. According to the data transmission completion signal from the photodiode 32, the data demodulating circuit 38 finishes the data demodulation and indicates on the display 42 that the data demodulation is normally completed.

In this explanatory embodiment, a user of the data transmitter 10 scans, namely swings horizontally, the optical axis 20 at an almost constant scanning speed. In this embodiment, the beam spread of the signal light is set small and therefore the signal light with the sufficient light intensity can enter the photodiode 32. As a result, the transmission rate of the signal light can be set to as fast as 1 Gbps. Since the signal light goes across the photodiode 32 momentarily, the signal light enters the photodiode 32 for just a short period of time. Although the time that the signal light enters the photodiode 32 is very short as described above, the data transmission rate is sufficiently fast and accordingly even an image data of 1 MB for example can be transmitted from the data transmitter 10 to the data receiver 12.

Having prepared for the data demodulation according to the dummy light, the data demodulating circuit 38 can start the data demodulation immediately after the photodiode 32 outputs the electrical signal in accordance to the input of the signal light. The data demodulating circuit 38 stores the demodulated data in the memory 40. The data demodulating circuit 38 finishes the data demodulation when it detects the data transmission completion signal in the output electrical signal from the photodiode 32. When the demodulation of the necessary data is normally completed, the normal data reception is indicated on the display 42. When the data is not normally received for some reason as the open data transmission is interrupted halfway, the controlling circuit 34 indicates the abnormal data reception, namely the receiving failure, on the display 42. It is applicable to use sound for informing a result of data reception, success or failure, instead of indicating the result on the display 42, or the sound information and the indication on the display 42 can be used together.

Figure 3:
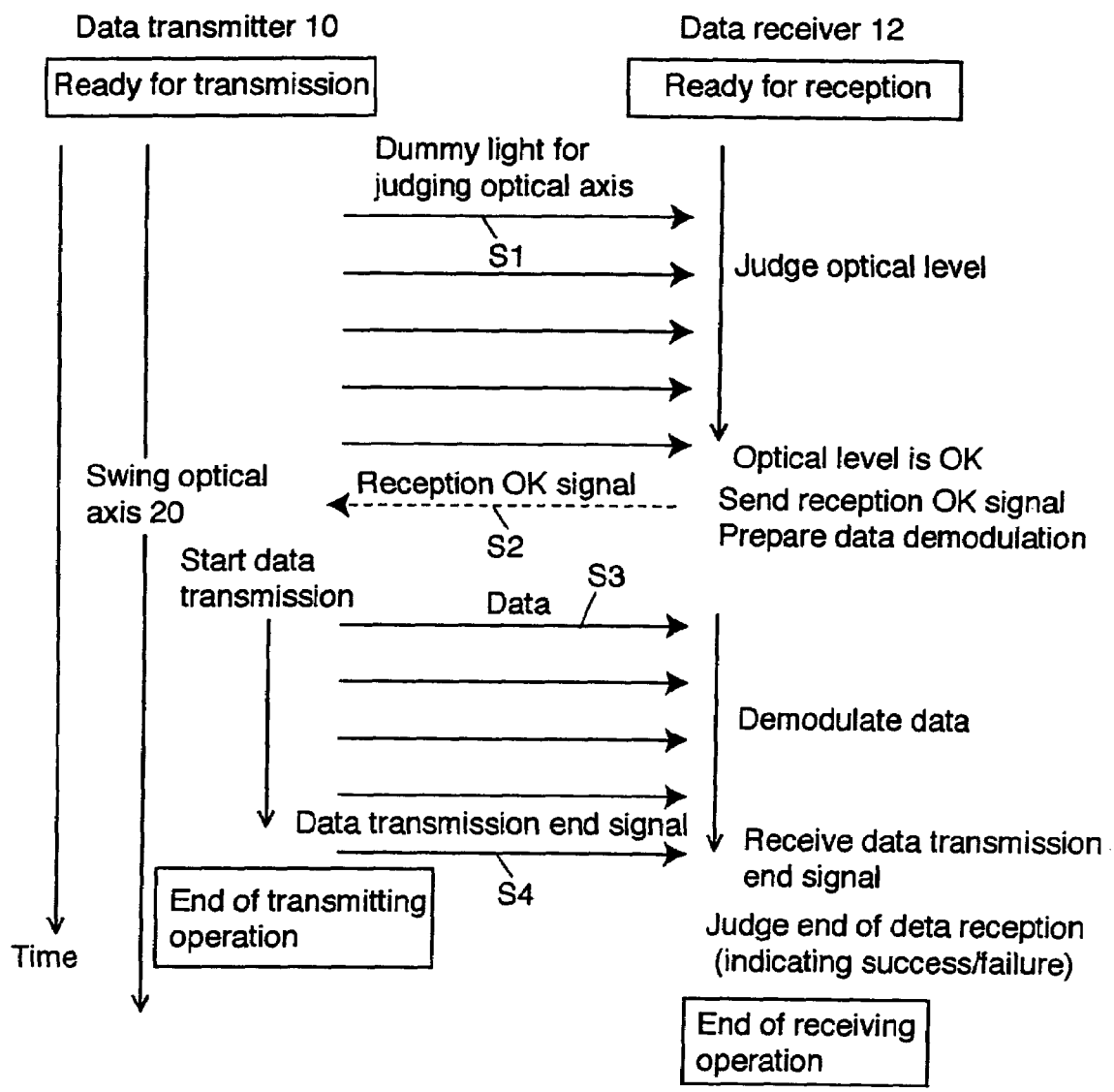
FIG. 3 shows the operating sequence of the first exemplary embodiment.

When the receiving failure is indicated on the display 42 of the data receiver 12, the user of the data transmitter 10 retries the sequence shown in FIG. 3. In this exemplary embodiment, since a transmission rate can be set fast, the time required for the data transmission becomes shorter. Therefore, it is satisfactory if the optical axis of the open transmission line between the data transmitter 10 and the data receiver 12 is aligned for an instant. Accordingly, even such a manual method to horizontally swing the optical axis of the output signal light from the data transmitter 10 can reliably transmit a large volume of data to the data receiver 12.

Another simple method to align the optical axis of the open transmission line between the data transmitter 10 and the data receiver 12 is explained. The data transmitter 10 and the data receiver 12 are manually set positions so that the photoreceiving level of the photodiode 32 becomes the required value or more and then the data transmitter 10 and, if necessary, the data receiver 12 are kept to stay on the determined positions.

Figure 4:
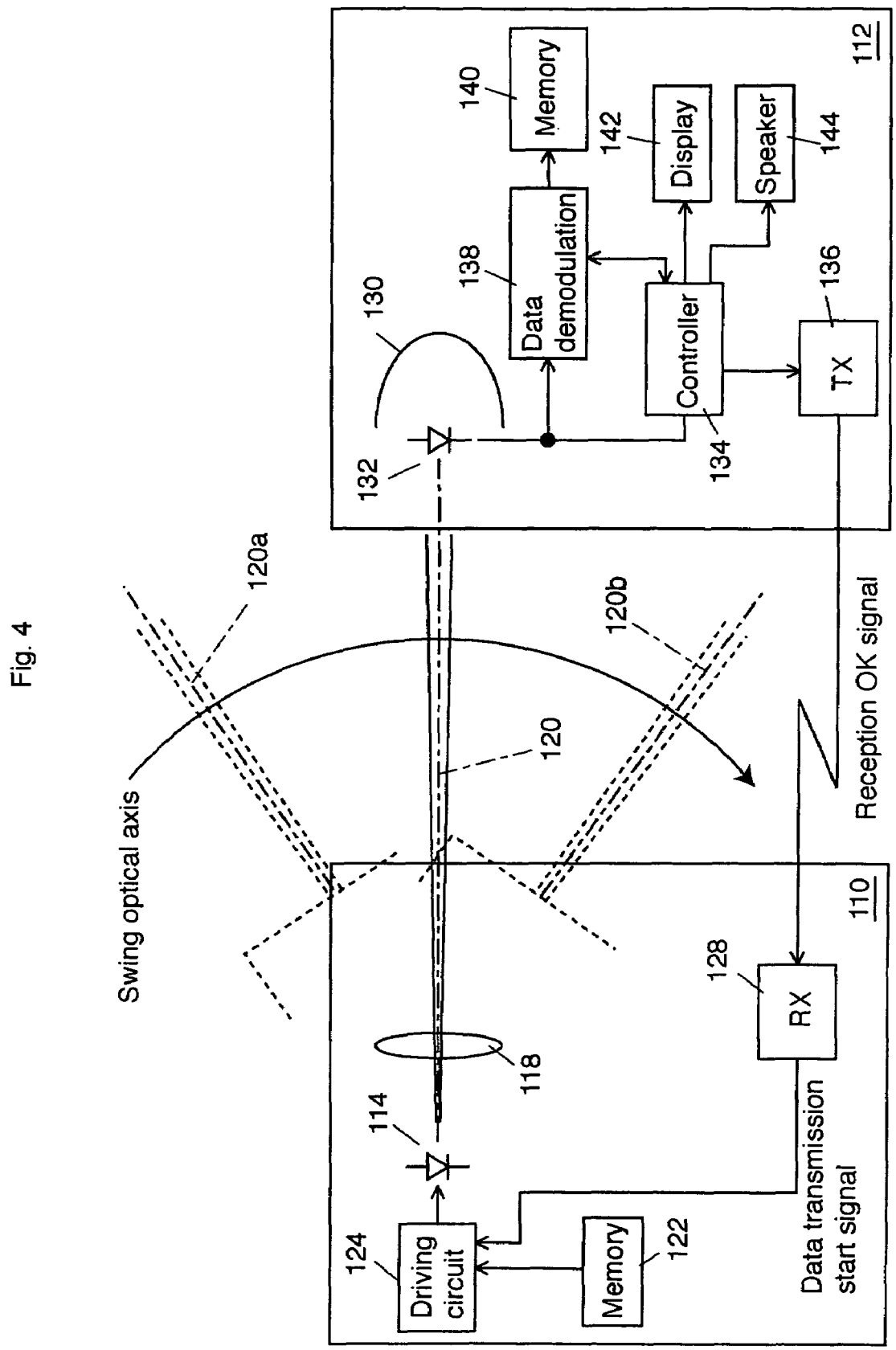
FIG. 4 shows a schematic block diagram of a second exemplary embodiment according to the invention.

FIG. 4 shows a schematic block diagram of the second exemplary embodiment according to the invention. In this exemplary embodiment, as an optical system tolerant to gap of optical axes is employed as a photoreceiving part of a data receiver 112, the laser diode 16 to output a dummy laser light is omitted.

A data transmitter 110, for example a cellular telephone, transmits a data for a data receiver 112 through optical open transmission. The adjustment of the optical axis of the free space optical transmission path between the data transmitter 110 and the data receiver 112 is manually performed. However, since high-speed transmission is realized as described below, the data transmission itself can be completed in a moment.

The configuration and basic operation of the data transmitter 110 is explained next. The data transmitter 110 includes a laser diode 114 to generate a signal light which carries a data and a projection lens which outputs the signal light from the laser diode 114 toward the outside as a narrow beam.

A memory 122 stores a data to be transmitted, e.g. an image data. A driving circuit 124 normally pulse-drives the laser diode 114. However, when a data transmission start signal from a receiving circuit (which is mentioned below) 128 inputs the driving circuit 124, the driving circuit 124 reads out the data from the memory 122 to drive the laser diode 114 according to the read-out data. The laser diode 114 outputs a mere pulse laser light before transmitting the data and when transmitting the data it outputs a signal light which carries the data read out from the memory 122 through intensity modulation.

A receiving circuit 128 receives a reception OK signal from the data receiver 112. Having received the reception OK signal, the receiving circuit 128 transmits the data transmission start signal to the driving circuit 124. The driving circuit 124 reads out the data from the memory 122 to drive the laser diode 114, according to the data transmission start signal from the receiving circuit 128.

The configuration and basic operation of the data receiver 112 is explained. The data receiver 112 includes a parabola 130 or a concave reflector and a photodiode 132 disposed on a focal point of the parabola 130 or the concave reflector. The parabola 130 reflects a laser light output from the data transmitter 110 to send to the photodiode 132. By using the parabola 130, a gap of the optical axes can be reduced. That is, as to be described later, even in such a case that a user of the data transmitter 110 manually swings the data transmitter 110 horizontally to scan the optical axis 120, the period that the laser light is entering the photodiode 132 can be comparatively extended.

The photodiode 132 outputs an electrical signal of amplitude corresponding to the intensity of the input light. A controlling circuit 134 detects an output electrical signal level of the photodiode 132 to control a transmitting circuit 136, a data demodulating circuit 138, and a speaker 144 according to the detected result.

As the first function of the controlling circuit 134, the controlling circuit 134 instructs the transmitting circuit 136 to inform (the receiving circuit 128 of) the data transmitter 110 that the data is receivable and instructs the data demodulating circuit 138 to start demodulating the data, when an input optical level of the photodiode 132 reaches a level capable of receiving data or more. In this exemplary embodiment, there is no dummy laser light temporally prior to the signal light and accordingly it is determined whether the optical power of the signal light entered the photodiode 132 is sufficient for the data reception.

The transmitting circuit 136 transmits a reception OK signal to the receiving circuit 128 of the data transmitter 110 according to the instruction from the controlling circuit 134. The data demodulating circuit 138 starts to demodulate the data carried by the electrical signal output from the photodiode 132 according to the instruction from the controlling circuit 134. The controlling circuit 134 indicates on the display 142 that the demodulation of the received data is started. Having completed the data demodulation, the data demodulating circuit 138 informs the controlling circuit 134 of the completion. The controlling circuit 134 indicates the completion of the demodulation of the received data, namely the completion of the data reception, on the display 142.

As a medium to transmit a signal light from the transmitting circuit 136 to the receiving circuit 128, any of optical, acoustical, and wireless media can be used. Since the reception OK signal is a trigger signal to start transmission, even a quite slow-speed transmission medium is applicable such as infrared transmission having a wide field angle, short-range wireless transmission as represented by Bluetooth, and acoustic pulse transmission.

As the second function of the controlling circuit 134, the circuit 134 outputs a sound from a speaker 144, the sound having frequency or volume corresponding to an incident optical level of the photodiode 132, even when the input optical level of the photodiode 132 does not meet a level sufficient for receiving the data. For instance, the speaker 144 outputs a high-pitched sound when the input optical level of the photodiode 132 is low and outputs a low-pitched sound when the input optical level of the photodiode 132 is high.

Accordingly, a user of the data transmitter 110 can confirm to what extent its optical axis aligns with the data receiver 112.

As a method to inform a user about a received light level of the data receiver 112, besides producing high and low-pitched sounds, there are methods such as producing large and small volume of sounds, changing intervals of pulse sounds, changing of emitting intensity of LED or changing of blink intervals of LED, and indicating digital display of a received optical level.

In this exemplary embodiment, since there is no dummy laser light temporally prior to the signal light, the moment when the optical axis aligns between the data transmitter 110 and the data receiver 112, that is, the moment when the data transmitter 110 becomes capable of transmitting a data to the data receiver 112 through open transmission, is determined from the intensity of an input laser light of the photodiode 132 output from the laser diode 114.

The operating method of this embodiment is explained in details. In this embodiment, the data transmitter 110 is held in a user's hand and accordingly the optical axis 120 does not stably align with the photoreceiving part of the data receiver 112. The data receiver 112 also can be a hand-held portable terminal.

First, the data transmitter 110 is set to a ready-to-transmit state in which the laser diode 114 is prepared to output a pulse laser light. The data receiver 112 is generally in a ready-to-receive state or set to the ready-to-receive state through an operative apparatus which was not illustrated.

While the data transmitter 110 is outputting the pulse laser light, its user swings the data transmitter 110 horizontally so that the optical axis 120 of the laser light goes across an input window (not illustrated) on the photoreceiving part of the data receiver 112. Because of the parabola 130, the laser lights from a wider-angle range can enter the photodiode 132. The controlling circuit 134 outputs a sound from the speaker 144, the sound having a frequency corresponding to a level of the electrical signal output from the photodiode 132.

When the optical axis 120 approximately aligns with the photodiode 132, a level of the electrical signal output from the photodiode 132 exceeds a threshold for the data reception. Then, the controlling circuit 134 instructs the transmitting circuit 136 to transmit a reception OK signal and instructs the data demodulating circuit 138 to prepare for the data demodulation. When the receiving circuit 128 in the data transmitter 110 receives the reception OK signal from the transmitting circuit 136, it transmits a data-transmission start signal to the driving circuit 124. The driving circuit 124 reads out the data stored in the memory 122 according to the data transmission start signal from the receiving circuit 128 and drives the laser diode 114 according to the read-out data. With those operations, the laser diode 114 outputs a signal light to carry the data read out from the memory 122.

The signal light output from the laser diode 114 enters the photodiode 132 via the optical system 118 and parabola 130 to be converted into an electrical signal by the photodiode 132. The data demodulating circuit 138 is already prepared for the data modulation because of the reception OK signal from the controlling circuit 134 that was temporally prior to the signal light, and accordingly the data demodulating circuit 138 demodulates the data out of the electrical signal from the photodiode 132. The demodulated data is stored in the memory 140.

When all the to-be-transmitted data is transmitted for the data receiver 112, the driving circuit 124 drives the laser diode 114 with a data transmission end signal which indicates the completion of the data transmission. With this operation, the laser diode 114 outputs a signal light to indicate the completion of the data transmission. The signal light enters the photodiode 132 via the optical system 118 and the parabola 130 to be converted into an electrical signal by the photodiode 132. The controlling circuit 134 ends the data modulation of the data demodulating circuit 138 according to the data transmission end signal from the photodiode 132 and indicates on the display 142 that the data reception is successfully completed.

In the process of swinging the directions of the data transmitter 110, the period that the optical axis 120 aligns with the photodiode 132 so that the data transmitter 110 can transmit a data to the data receiver 112 is long enough to complete such transmission that, for example, a 1 Gbps signal light transmits a 1 MB data.

In this exemplary embodiment, the user of the data transmitter 110 can swing the optical axis 120 horizontally at an approximately constant speed. In the embodiment, owing to the parabola 130, even if the optical axis 120 of the signal light does not exactly align with he photodiode 132, a sufficient light intensity of signal light can enter the photodiode 132. That is, this exemplary embodiment has an optical receiving system which can deal with shifts of the optical axis 120.

Because the beam spread of the signal light is set small, a sufficient light intensity of signal light can enter the photodiode 132. Consequently, the transmission rate of the signal light can be set to as fast as 1 Gbps. The signal light goes across the photodiode 132 momentarily but for a longer period compared to the first exemplary embodiment and accordingly the signal light can enter the photodiode 132 for a longer period compared to the first embodiment. Although the period in which the signal light enters the photodiode 132 is very short as stated above, since the data transmission rate is sufficiently fast, even an image data of 1 MB, for example, can be transmitted from the data transmitter 110 to the data receiver 112 using this exemplary embodiment.

When the demodulation of the necessary data is successfully completed, the display 142 indicates that the data was successfully received. When the data reception was not successfully completed because of the disconnection of open data transmission, for example, the controlling circuit 134 indicates on the display 142 about the unsuccessful data reception, namely the reception failure. It is also applicable to indicate results of successful or unsuccessful data reception using a sound from the speaker 144 instead of the indication on the display 142 or it is applicable to use the indication on the display 142 and the sound information from the speaker 144 together.

The user of the data transmitter 110 retries the above sequence when he/she was informed the failure of the data reception through the display 142 and/or the speaker 144 in the data receiver 112. In this exemplary embodiment, the transmission rate can be set high-speed and therefore the time required for the data transmission becomes inevitably shorter. Accordingly, as far as the optical axes between the data transmitter 110 and the data receiver 112 align with each other only momentarily, though the aligning period should be longer compared to that of the first embodiment, the method to manually swing the optical axis of the signal light from the data transmitter 110 on the level is sufficient to transmit a large volume of data securely from the data transmitter 110 to the data receiver 112.

The configuration of the photoreceiving part, which comprises the parabola 130 and the photodiode 132, of the data receiver 112 is applicable to the first exemplary embodiment in which the dummy light output from the light source that is different from that of the signal light is used.

Figure 5:
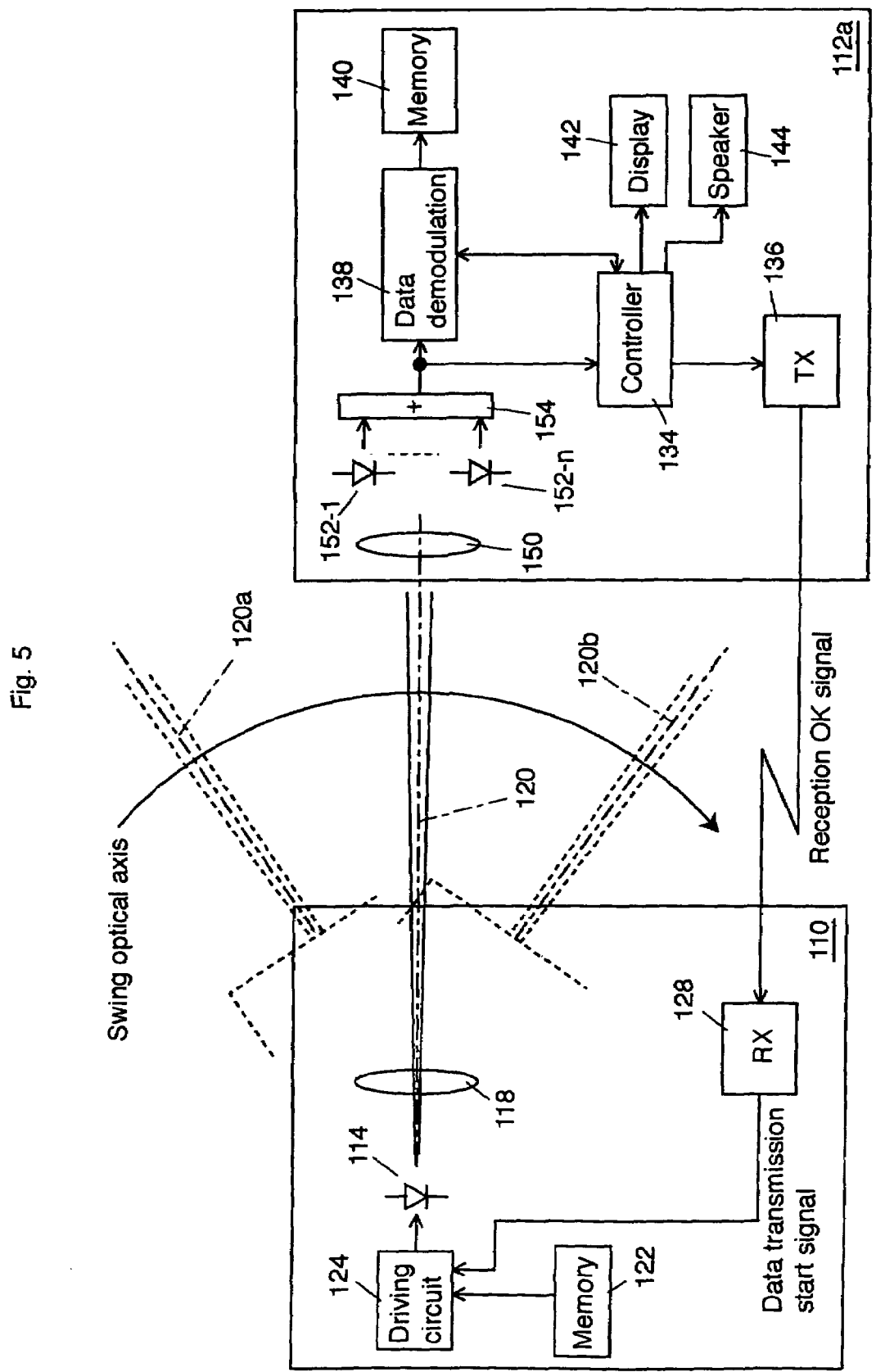
FIG. 5 shows a schematic block diagram of a third exemplary embodiment according to the invention.

It is also applicable that a plurality of photodiodes are disposed in parallel to photoreceive laser beams from a broader range. FIG. 5 shows a schematic block diagram of a third exemplary embodiment in which the data receiver 112 of the second exemplary embodiment is modified.

In a data receiver 112a, a photodiode array including a plurality of photodiodes 152-1 to 152-n is disposed on a condensing surface of a lens 150 to condense signal lights and an adder 154 adds electrical signals output from the photodiodes 152-1 to 152-n. The plurality of photodiodes 152-1 to 152-n can be disposed either linearly like a line sensor or two-dimensionally like a camera image sensor. The adder 154 is realized on a wired OR circuit. An electrical signal output from the adder 154 is applied to the controlling circuit 134 and the data demodulating circuit 138. The operations of the other components of the data demodulator 112a are the same with those of the second exemplary embodiment and therefore their detailed explanations are omitted.

In this exemplary embodiment, even if the optical axis 120 shifts horizontally from or has an angle to the optical axis of the condensing lens 150, there is a high possibility that the signal light enters any of the photodiodes 152-1 to 152-n. When the signal light enters any of the photodiodes 152-1 to 152-n, an electrical signal corresponding to the signal light enters the controlling circuit 134 and the data demodulating circuit 138, and therefore the data receiver 112a can receive the data transmitted from the data transmitter 110.

In this exemplary embodiment, even when the optical axis 120 of the signal light scans to go across the condensing lens 150, the period that the data receiver 112a can receive the signal light becomes longer compared to the case in which a single photodiode is used and, moreover, this embodiment is reliable against gap of the optical axes. With this embodiment, a large volume of data can be transmitted from the data transmitter 110 to the data receiver 112a by a high-speed signal light.

The configuration of the photoreceiving part, which comprises the condensing lens 150 and the plurality of photodiode 152-1 to 152-n, of the data receiver 112a can be applied to the first exemplary embodiment in which the dummy light output from the light source that is different from that of the signal light is used.

Portable information-processing equipments such as cellar phones, computers, printers, video equipments and information boxes can be used as any of the data transmitters 10 and 110 and the data receivers 12, 112, and 112a. An information box is a data distributing apparatus to distribute electronic books, music data, and travel guide data etc. to users. An information box is either connected to a network or set to be stand-alone.

Each of the above-described exemplary embodiments can be used for data transmission between portable information-processing equipments, data transmission from portable information-processing equipment to a computer, a printer, video equipment, an information-processing electric household appliance, and an information box, and data transmission from an information box to portable information-processing equipment. When the data transmitter 10, 110 is an information box, it automatically scans the optical axis 20, 120 of a signal light in a reciprocating motion and accordingly a user can simply point his/her portable terminal at the signal light output part of the information box, keeping the photoreceiving part of the portable terminal within the scan range of the optical axis 20, 120.

Data to be transmitted between portable information-processors can be an image data, a video data, an address book data, and other data files, for example. Data transmitted from a portable terminal to an information box are, for example, a music data, a video data, book data, and merchandise information (travel guides, real estate information, and catalogues etc.) and so on and those data can be downloaded from the information box to the portable terminal either without charge or paying a charge. Conversely, the portable terminal can upload a photographed image data to the information box. Moreover, the exemplary embodiments can be used for video data transmission from an image recording system such as a HDD video recorder to a portable terminal, music data transmission from a DVD, CD or MD reproducer to a portable terminal, and data transmission between a car navigation system and a portable terminal.

Furthermore, the subject exemplary embodiments can be applied for data transmission from an information box installed at a ticket gate or its surroundings in a railway station to a portable terminal. For instance, while a user of a portable terminal is passing through a ticket gate, he/she can download information from an information box disposed on the ticket gate to his/her portable terminal, the information such as a neighborhood map data, an exit guide map, a station yard guide map, and a neighboring shops guide and so on.

While the invention has been described with reference to the specific embodiment, it will be apparent to those skilled in the art that various changes and modifications can be made to the specific embodiment without departing from the spirit and scope of the invention as defined in the claims.

The invention claimed is:

1. A data transmission system to transmit data through open transmission, the system comprising:
   a data transmitter,
      wherein the data transmitter is a portable terminal; and
   a data receiver,
   wherein the data transmitter comprises:
      a laser light source to generate a signal light;
      a dummy light source to generate a dummy light for judging an optical axis;
      an optical system to output the signal light and the dummy light on the optical axis, and causing a beam spread of the signal light smaller than a beam spread of the dummy light;
      a receiving circuit to receive a reception OK signal from the data receiver; and
      a driving circuit to drive the laser light source to output the signal light for carrying the data responsive to the reception OK signal,
   wherein the data transmitter is capable of causing the optical axis of the signal light and the dummy light to scan across a photoreceiving part of the data receiver, and
   wherein the data receiver comprises:
      a photodetector to optically receive the dummy light and the signal light, said photodetector outputting a first electrical signal when receiving the dummy light and outputting a second electrical signal when receiving the signal light;
      a level judging apparatus to judge a level of the first electrical signal from the photodetector;
      a transmitting circuit to transmit the reception OK signal to the data transmitter when the first electrical signal from the photodetector has a level equal to or greater than a predetermined level responsive to a result from the level judging apparatus;
      a data demodulating circuit for demodulating the second electrical signal from the photodetector when the first electrical signal from the photodetector has a level equal to or greater than the predetermined level and obtaining the data included in the second electrical signal; and a reception result indicator to inform a user of a reception result of the data.

2. The system of claim 1 wherein optical power of the signal light is larger than optical power of the dummy light.

* * * * *